April 1, 1924.
O. HAMPE
PRESSURE GAUGE
Filed Dec. 20, 1920
1,488,877
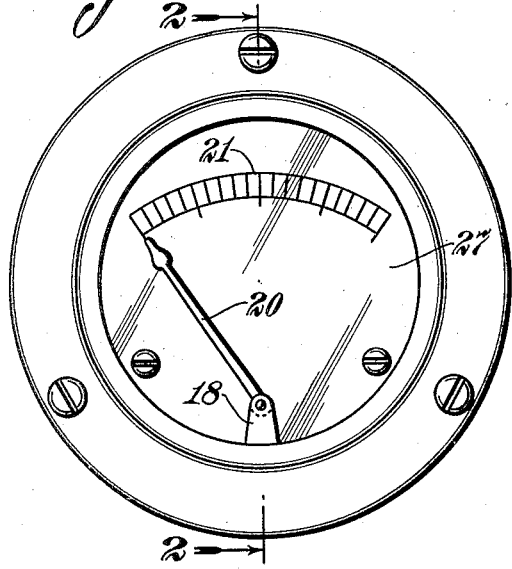
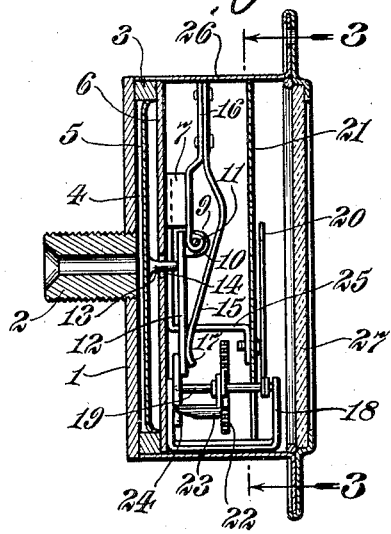
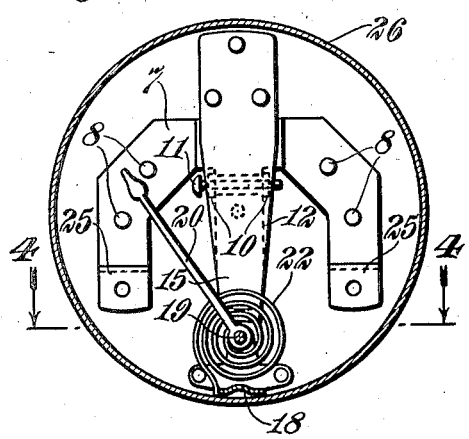
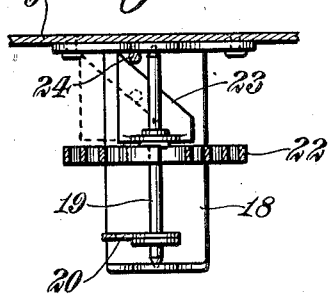
Inventor:
OTTO HAMPE,
John H. Bruninga
His Attorney.

Patented Apr. 1, 1924.

1,488,877

UNITED STATES PATENT OFFICE.

OTTO HAMPE, OF ST. LOUIS, MISSOURI, ASSIGNOR, BY MESNE ASSIGNMENTS, TO B-W ELECTRIC COMPANY, A CORPORATION OF MISSOURI.

PRESSURE GAUGE.

Application filed December 20, 1920. Serial No. 432,032.

*To all whom it may concern:*

Be it known that I, OTTO HAMPE, a citizen of the United States, and residing at St. Louis, Missouri, have invented the new and useful Improvement in Pressure Gauges, of which the following is a specification.

This invention relates to pressure gauges and is particularly adapted for use as an oil gauge for the lubricating system of an automobile or similar service.

One of the objects of this invention is to provide a pressure gauge in which the mechanism is simple in construction and operation, and which will not easily get out of order.

Another object of this invention is to provide a pressure gauge which will be cheap to construct and which will occupy a small space.

Further objects will appear from the detail description taken in connection with the accompanying drawing, in which:

Figure 1 is a front view of a pressure gauge embodying this invention;

Figure 2 is a section on line 2—2 of Figure 1;

Figure 3 is a section on line 3—3 of Figure 2; and

Figure 4 is an enlarged partial section on line 4—4 of Figure 3.

Referring now to the drawing, the pressure gauge comprises a base 1 provided with a nipple 2 for attachment of the conduit leading to the source of which the pressure is to be measured, and a flange 3. The base 1, the nipple 2 and the flange 3 may be integrally combined in the form of a casting, or they may be built up of separate parts as indicated in Figure 2, the base 1 being in the latter case a metal plate into which the nipple 2 may be screwed and the flange 3 in the form of a ring may be soldered, brazed or otherwise suitably attached to the plate 1. A chamber 4 is thereby formed in the base, and this chamber may be closed by a diaphragm 5 which is preferably made of thin, flexible metal such as sheet copper and which may, if desired, be corrugated to increase its flexibility.

Mounted on the flange 3 is a supporting plate 6, preferably of sheet metal, upon which the indicating mechanism may be mounted. To that end a supporting bracket 7 may be fixed to the plate 6 by means of rivets 8 or in any other suitable manner. Pivoted at 9 upon the bracket 7, which may be provided with bearings 10 to accommodate a pivot pin 11, is a lever 12. Mounted centrally on the diaphragm 5 is an abutment 13 which is adapted to extend through an aperture 14 in the plate 6 and to engage the lever 12 at a point adjacent its pivot 9. With this construction, liquid pressure acting on the diaphragm 5 from within the chamber 4 will tend to move the abutment 13 to the right, Figure 2, thereby through its engagement with the lever 12 moving that lever on its pivot so as to move the lower end thereof to the right, Figure 2.

Said movement of the lever 12 is restrained by a flat spring 15 mounted on an extension 16 of the bracket 7 and bearing on the lever 12 at 17. The movement of the lever 12 is thereby restrained by a force opposing the action of the liquid pressure in addition to the force exerted by the resiliency of the diaphragm 5. This force of the spring 15 may be made the predominant force which the liquid pressure must overcome in moving the lever 12 and it will be evident, therefore, that the calibration of the instrument may be varied or adjusted by varying the force exerted by the spring 15. Provision for the adjustment of that force has been made in mounting that spring on the free extension 16 of the bracket 7. It will be evident that the force with which the spring 15 bears upon the lever 12 may easily be adjusted by bending the extension 16 by means of a pair of pliers or other suitable instrument. By this construction, therefore, the calibration of the instrument is under complete control.

Mounted at the lower part of the supporting plate 6 is a U-shaped bracket having bearings adapted to accommodate the pointed ends of a pivot staff 19 carrying an indicating needle 20 adapted to move over a suitable scale 21 mounted on a pair of outstanding arms 25 on the bracket 7. The movement of the staff 19, and therefore of the indicating element 20 is restrained by a very light spiral spring 22, the inner end of which may be attached to the staff 19 and the outer end to the bracket 18. The staff 19 also carries a cylindrical cam element 23 having a cam face adapted to be engaged by a pin 24 fixed to the lever 12. The construction is such that when the lever 12 moves to the right, Figure 2, (downward Figure 4) the pin 24 will engage the inclined edge of the cam 23 so as to cause rotation of said cam and, therefore, of the staff 19 and the indicating element 20 in accordance with the movement of the lever 12. The dotted lines in Figure 4 show the cam in deflected position. The graduation of the scale 12 may be laid out in any well known manner to indicate the liquid pressure in the chamber 4.

It will be evident that since the staff 19 and its adjacent parts may be made very light and the spring 22 may also be very light that the pressure and consequently the friction between the pin 24 and the cam 23 will be very light and will therefore interfere to only a very slight extent with the movement of the indicating element. Since that friction is the only thing tending to effect the accuracy of calibration of the instrument, it will be evident that said accuracy can be carried to a relatively high degree.

The complete mechanism may be encased in a suitable casing 26 having a cover glass 27 in the usual way.

It is obvious that various changes may be made in the details of construction without departing from the spirit of this invention; it is to be understood, therefore, that this invention is not to be limited to the specific details shown and described.

Having thus described this invention, what is claimed is:

1. A pressure gauge, comprising, a pressure chamber closed by a flexible diaphragm, a pivoted lever, an abutment on said diaphragm adapted to engage said lever, a pivoted indicating element, and a cam element connected to swing with said element and having a cam face adapted for engagement with, and to be moved by said lever.

2. A pressure gauge, comprising, a pressure chamber closed by a flexible diaphragm, a supporting bracket having a free extension, a lever pivoted on said bracket, a spring fixed to said extension and bearing on said lever, an indicating element, and operating connections between said lever and said element.

3. A pressure gauge, comprising, a pressure chamber closed by a flexible diaphragm, a support including a bracket having a free extension, a lever pivoted on said support, a spring fixed to said extension and bearing on said lever, an abutment on said diaphram extending through said support and engaging said lever, an indicating element, and operating connections between said lever and said element.

4. A pressure gauge, comprising, a pressure chamber closed by a flexible diaphragm, a pivoted lever, an abutment on said diaphragm adapted to engage said lever, a spring-restrained indicating element having a cam, and means on said lever engaging said cam adapted to move said element.

5. A pressure gauge, comprising, a pressure chamber closed by a flexible diaphragm, a supporting bracket having a free extension, a lever pivoted on said bracket, a spring fixed to said extension and bearing on said lever, a spring-restrained indicating element having a cam, and means on said lever engaging said cam adapted to move said element.

6. A pressure gauge, comprising, a pressure chamber closed by a flexible diaphragm, a support including a bracket having a free extension, a lever pivoted on said support, a spring fixed to said extension and bearing on said lever, an abutment on said diaphragm, extending through said support and engaging said lever, a spring-restrained indicating element having a cam, and means on said lever engaging said cam adapted to move said element.

7. A pressure gauge, comprising, a pressure chamber closed by a flexible diaphragm, a supporting bracket having a free extension, a lever pivoted on said bracket, a spring fixed to said extension and bearing on said lever, a spring-restrained indicating element having a cam, and a pin on said lever engaging said cam adapted to move said element.

8. A pressure gauge, comprising, a pressure chamber closed by a flexible diaphragm, a support including a bracket having a free extension, a lever pivoted on said support, a spring fixed to said extension and bearing on said lever, an abutment on said diaphragm, extending through said support and engaging said lever, a spring-restrained indicating element having a cam, and a pin on said lever engaging said cam adapted to move said element.

9. A pressure gauge, comprising, a pressure chamber closed by a flexible diaphragm, a pivoted indicating element, a cam element connected to swing therewith and provided with a cam face, a spring for returning said elements, and means connected with said diaphragm adapted to engage said cam face in order to swing said cam element and its connected indicating element against the tension of said spring.

In testimony whereof I affix my signature this 20th day of September, 1920.

OTTO HAMPE.